United States Patent
Bowman

[11] 3,736,359
[45] May 29, 1973

[54] ELECTRIC FURNACE
[75] Inventor: Brian Bowman, Geneva, Switzerland
[73] Assignee: British Steel Corporation, London, England
[22] Filed: Mar. 29, 1972
[21] Appl. No.: 239,107

[52] U.S. Cl. ............................13/9, 13/18, 13/34
[51] Int. Cl. ...................................H05b 7/08
[58] Field of Search..................13/1, 9, 18, 34; 219/137

[56] References Cited
UNITED STATES PATENTS

| | | | |
|---|---|---|---|
| 2,909,422 | 10/1959 | Schwabe | 13/18 UX |
| 3,101,385 | 8/1963 | Robinson | 13/18 X |
| 3,389,209 | 6/1968 | De Corso | 13/18 |

Primary Examiner—Roy N. Envall, Jr.
Attorney—Bacon & Thomas

[57] ABSTRACT

Particulate metal in flowable form or liquid metal is continually dispensed on to the charge in the furnace vessel through a tubular non-consumable electrode constituting a reservoir for this metal. The metal discharges through a nozzle on the tip of the electrode and an arc is sustained in the metal flowing between this nozzle and the charge surfaces. In the case of particulate metal this would normally comprise only part of the total metal charge ultimately in the furnace, unless the application is in respect of vacuum arc remelting or refining where it would constitute the whole charge. Where liquid metal is employed this only constitutes a small proportion of the total charge. In the latter embodiment starting presents no problem since a conductive path is provided but, with particulate metal, where a conductive path is not provided initially, starting is effected with the aid of an auxilliary electrode.

17 Claims, 2 Drawing Figures

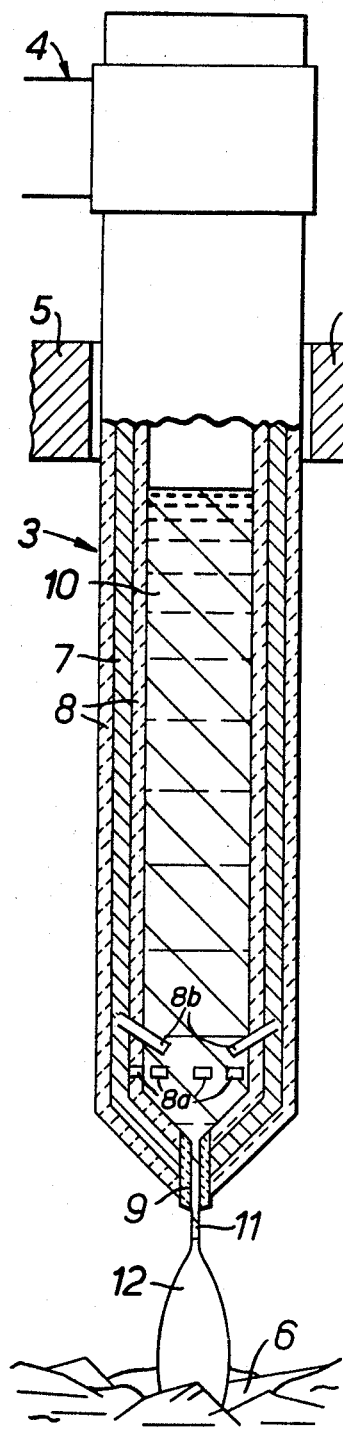
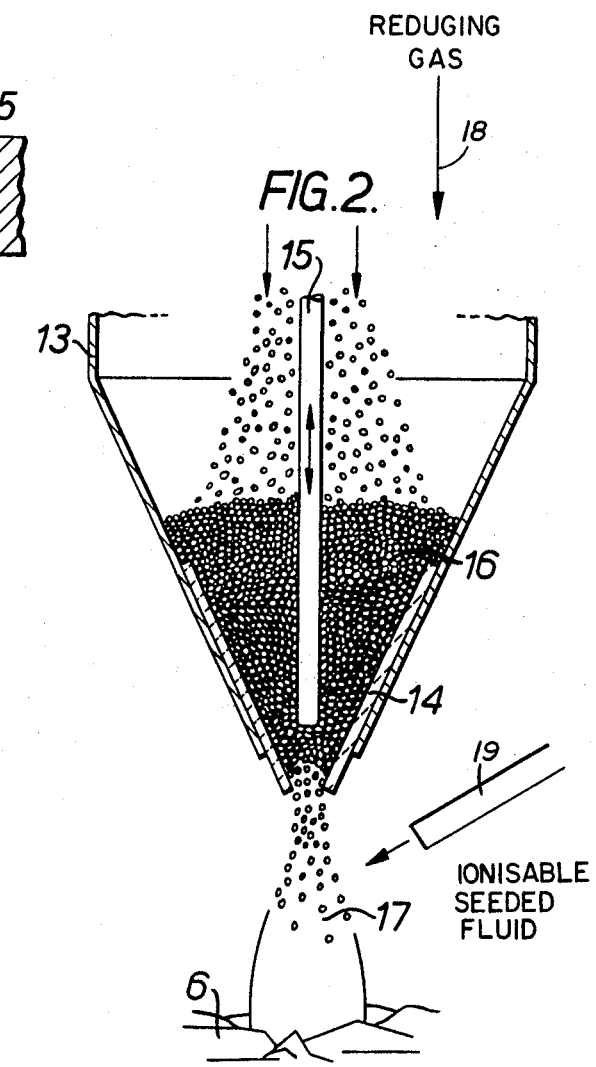

ELECTRIC FURNACE

This invention relates to a method of and apparatus for steel making in an electric furnace and to electric steelmaking furnaces, e.g. arc furnaces or electrode remelting furnaces, and more particularly relates to a method of melting a metal charge and the electrode employed in this method.

Arc furnaces of the "direct" type in which an arc is struck between a graphite electrode and the charge are conventionally ignited by moving the electrode into contact with the metal charge e.g. steel scrap, in the vessel so as to create a short-circuit and then the electrode is withdrawn upwards, drawing an arc with it. Thereafter, the charge is melted by the heat generated and the electrode is slowly consumed during this process.

Several disadvantages are attendent on this manner of operation however since, quite apart from the obvious disadvantage of having the electrode consumed (which is an expensive item) and possibly fractured on striking the charge, the electrical power input is low before a consistent arc is obtained and the arc may even then run in an unstable manner and local "hot spots" may be realised eroding the refractory-lined walls.

It is an object of this invention to mitigate these drawbacks in relation to arc furnaces but it is to be understood that, as mentioned, the invention is also relevant in vacuum arc electrode re-melting or refining. In particular, in the latter scheme an arc is struck between a metal electrode and a starter block (constituting an initial "charge") in a crucible in an evacuated atmosphere and the heat from the arc progressively melts the electrode which is thus consumed and re-constituted in the molten metal pool in the crucible. The metal re-melted and re-constituted in this fashion has fewer impurities and better properties than the starting electrode by reason of the removal of impurities under vacuum.

With the present invention, such remelting can be performed by a new method which avoids the need for a consumable electrode, as such, and ensures a stable arc, reducing the risk of crucible wall erosion.

According to one aspect, the present invention provides a method of steelmaking by melting a charge in an electric furnace, in which particulate or liquid metal is continually dispenses on to the charge through a nozzle on the tip of a tubular non-consumable electrode, an arc being sustained in the metal flowing between the electrode nozzle and the surface of the charge.

The invention also provides apparatus for performing this method, the tubular electrode constituting a replenishable reservoir for the metal and being movable away from and towards the charge through the roof of the furnace.

The electrode is preferably made from a conductive metal, but alternatively it may be insulated and simply embody a conductive path for conducting current to the metal the nozzle which may be made from a refractory material.

The operating and physical parameters, e.g. the applied voltage and the current flow, the dimensions of the nozzle aperture, the properties of the metal and its flow rate etc., are chosen such as to achieve a balanced condition in which the arc runs from just below the nozzle tip to tthe charge surface. In this manner the nozzle tip is not subjected to such a harsh environment and erosion is less severe than would otherwise be the case.

Molten steel is preferably employed in the "liquid" embodiment and if particulate metal is employed steel balls or pre-reduced iron pellets may be used, the latter being particularly advantageous since they have good electrical conductivity and the higher the conductivity the less is the chance of them welding together at the nozzle aperture.

With the liquid case the amount of liquid metal discharged through the nozzle is only very small in relation to the size of the initial charge entered in the vessel, at least in so far as its use in arc furnaces is concerned, but with the particulate metal case, particularly where pre-reduced iron pellets are used, these pellets may ultimately comprise about half the total vessel charge depending on the scrap/pellet ratio desired in the furnace and, of course, will comprise the whole of the re-constituted charge in the case of re-melting.

With the liquid case starting presents no problem but when the particulate metal is initially dispensed through the nozzle there is no continuous conductive path between this metal in the reservoir and the charge surface. Thus, in this instance it is convenient to effect starting by using an auxillary electrode, e.g. a graphite rod; this rod may be projected through the nozzle aperture on to the charge and then withdrawn, drawing the arc with it which is then sustained in the falling stream of particulate metal. The rod may then be used for regulating the flow.

Alternatively, starting may be effected by the use of a fluid "seeded" with a compound which is ionised at the subsisting temperature so as to promote breakdown of the gap, e.g. as described in our co-pending patent application Ser. No. 215,310.

In addition, oxidation of the particulate metal may be minimised by passing a reducing gas through the electrode, and further, a gaseous or liquid fuel may be used to supplement the heat reaction in the bath.

In order that the invention may be fully understood, two embodiments thereof will now be described, by way of example, with reference to the accompanying drawings, in which:

FIG. 1 is a sectional side elevation through part of an arc furnace schematically illustrating this invention, with liquid steel in the tubular electrode; and FIG. 2 is a sectional side elevation similar to FIG. 1 with metal pellets in the tubular electrode.

Referring now to FIG. 1, an electrode 3 supported by an arm 4 extends through the roof 5 of an arc furnace vessel charged with steel scrap 6. The electrode is of tubular construction and includes a graphite sleeve 7 in an inner and outer refractory heat insulating casing 8, the electrode tapering at its tip to terminate in a refractory nozzle 9 having a circular orifice.

The graphite sleeve is connected to a current supply source and provision is made for a conductive path through the inner refractory casing 8 e.g., by apertures 8a in this casing or conductive pins 8b projecting therethrough so as to complete a current path to molten steel 10 which partly fills the tubular electrode, this "reservoir" of steel being continually topped-up from an external source (not shown). The scrap metal 6 completes the electric circuit in the normal way.

In operation, the liquid steel is introduced into the electrode, the power is switched-on and as the jet (11) of molten metal issues from the nozzle an arc 12 is struck and sustained in the flowing metal, melting the charge beneath.

The dimensions of the orifice and the resulting flow rate of the molten metal are such that a balanced flow is obtained by which the arc rises to a point just below the nozzle orifice — too fine a jet would boil and too low a flow rate would tend to cause the arc to extend right up to the nozzle orifice, ultimately destroying it.

The molten jet is maintained throughout the melt down simply so as to sustain the arc; the percentage of this metal which is reconstituted in the bath is negligible compared with the capacity of the latter.

Referring now to FIG. 2, a tubular steel electrode 13 is supported from above as before. This electrode is again tapered at its tip and is terminated in a refractory nozzle 14 having a circular orifice.

Mounted centrally within the electrode and reciprocably movable through the orifice is a circular-section rod 15 of graphite, this rod being used for starting and flow regulation in a manner to be described.

In operation, the rod 15 is initially positioned to seal the orifice and particulate metal 16, e.g., in the form of steel balls or pre-reduced iron pellets, is charged into the electrode. This metal is preferably spheroidal so as to flow easily. The electrode is then lowered towards the scrap metal charge 6 until it lies in close proximity thereto and then the graphite rod is moved down through the nozzle into contact with this charge creating a short-circuit, and then withdrawn, drawing an arc with it.

Continued withdrawal of the rod then exposes the aperture in the nozzle whereupon the particulate metal flows through and the arc 77 is sustained in this flow of metal. Thereafter the rod can be moved to regulate the flow, particulate metal continuously being charged into the electrode so as to maintain a constant "reservoir."

In practice, the flow rate and the electrode spacing are adjusted so that once the arc has been transferred from the rod to the massed metal particles at the mouth of the nozzle, it is thereafter sustained in this flowing metal to a point just below the nozzle orifice, as in the previous embodiment.

The comsumption of particulate metal may be very high; the particles re-constituted in the melt may in fact comprise the greater part of the ultimate vessel charge.

In this regard, compared with the current practice frequently employed by which such pellets are dispensed on to the scrap to supplement the charge, this invention offers significant advantages because whereas these pellets are dispensed on to the surface of the melt, i.e. on to the slag layer where they oxidise before combining, with this invention they are "jetted" directly into the melt, penetrating the slag layer. In addition, no additional aperture is required in the roof of the vessel for introducing these pellets which minimises fume effluent problems.

Clearly, accurate control of the flow rate at the nozzle is of prime importance in order to maintain the desired arc parameters and it must be ensured that the current density at the orifice is not so high as to weld the particles together at this point; welding may also be realised if the electrical conductivity of the particles is too low, i.e. if they have a high contact resistance. Care must also be taken to avoid the particles forming a natural bridge amongst themselves at the orifice; in this regard, it has been found that for a circular aperture the diameter of the orifice should be at least eight times the mean diameter of the particles for reliable flow.

As mentioned above, oxidation of the particles in the electrode may be minimised by passing a reducing gas through them, e.g., as exemplified by the arrow 18, and furthermore as an alternative to starting with the rod 15, starting may be effected by projecting a "seeded" fluid into the gap through an auxiliary lance 19.

Each of the embodiments described is suitable for either a.c. or d.c. energisation and either single or multiple electrodes, e.g. three for three-phase operation, may be used.

We claim:

1. A method of steelmaking by melting a charge in an electric furnace, comprising: continually dispensing a flowable metal on to the charge through a nozzle on the tip of a tubular, non-consumable electrode, and striking and sustaining an arc in the metal flowing between the electrode nozzle and the surface of the charge thereby melting the charge.

2. A method according to claim 1, in which said flowable metal is a
particulate metal constituted by prereduced iron pellets or steel balls.

3. A method according to claim 2, in which
starting is effected by a retractable auxiliary conductive electrode initially bridging the gap between the electrode tip and the charge so as to promote breakdown.

4. A method according to claim 2, in which
starting is effected by projecting an ionisable seeded fluid on to the gap between the electrode tip and the charge so as to promote breakdown.

5. A method according to claim 1, in which the method is performed in a vacuum-arc re-melting or refining furnace and, the flowable metal is a particulate metal and constitutes the whole of the ultimate vessel charge.

6. A method according to claim 2, in which
a reducing gas is passed through the particulate metal in the electrode.

7. A method of steelmaking by melting a charge in an electric furnace, comprising: continually dispensing a flowable metal on to the charge through a nozzle on the tip of a tubular non-consumable electrode, striking and sustaining an arc in the metal flowing between the electrode nozzle and the surface of the charge, and correlating
the electrical operating parameters,
the physical parameters of the electrode, and
the flow rate of the metal so as to achieve a blanced condition in which the arc runs from just below the nozzle tip to the charge surface, whereby to melt the charge and to reduce erosion of the nozzle tip.

8. A method according to claim 7, in which said flowable metal is a
particulate metal dispensed on to the charge, and
a reducing gas is passed through the particulate metal and
starting is effected by projecting an ionisable seeded fluid on to the gap between the electrode tip and the charge so as to promote breakdown.

9. A method according to claim 8, in which said electrode constitutes a reservoir for said flowable metal, and said flowable metal in said electrode provides a current conducting path between said electrode and the metal flowing from said nozzle.

10. Electric furnace steelmaking apparatus comprising a tubular, current conducting, non-consumable electrode constituting a reservoir for flowable, current conducting metal, and a non-current conducting nozzle at the tip of the electrode defining an orifice through which the metal is continuously dispensed on to the charge in the furnace, the flowable metal in said electrode providing a current conducting path between the current conducting electrode and the metal flowing from said nozzle whereby an arc may be struck and sustained in the metal flowing between the electrode nozzle and the surface of the charge for melting said charge.

11. Steelmaking apparatus according to claim 10, wherein
said flowable metal is a particulate metal and wherein the orifice in the nozzle tip is circular and has a diameter at least eight times the mean diameter of the particles.

12. Steelmaking apparatus according to claim 11, wherein
an auxiliary conductive electrode is mounted within the tubular electrode, the auxiliary electrode being movable towards and away from the charge for initially bridging the gap between the electrode tip and the charge to strike an arc.

13. Steelmaking apparatus according to claim 10, wherein
the electrode is made from an electrically conductive metal, and wherein
the nozzle tip is made from a refractory material.

14. Apparatus according to claim 10, wherein
the electrode is of composite construction embodying both electrically conductive and heat insulating refractory sleeves, and wherein
the nozzle tip is made from a refractory material.

15. Apparatus according to claim 10, wherein the electrode comprises an inner heat insulating refractory sleeve, an electrically conductive sleeve surrounding said refractory sleeve, and means connecting said electrically conductive sleeve with the interior of said tubular electrode.

16. Apparatus according to claim 10, wherein said flowable metal is liquid metal.

17. A method according to claim 1, in which said flowable metal is liquid metal.

* * * * *